United States Patent
Egelhaaf et al.

(10) Patent No.: US 9,774,228 B2
(45) Date of Patent: Sep. 26, 2017

(54) DRIVE SYSTEM IN THE FORM OF A TORQUE MOTOR

(71) Applicants: Joerg Egelhaaf, Aalen (DE); Peter Niemeyer, Bartholomae (DE)

(72) Inventors: Joerg Egelhaaf, Aalen (DE); Peter Niemeyer, Bartholomae (DE)

(73) Assignee: FRANKE & HEYDRICH KG, Aalen (DE)

( * ) Notice: Subject to any disclaimer, the term of this patent is extended or adjusted under 35 U.S.C. 154(b) by 82 days.

(21) Appl. No.: 14/620,585

(22) Filed: Feb. 12, 2015

(65) Prior Publication Data
US 2016/0241118 A1    Aug. 18, 2016

(51) Int. Cl.
| H02K 7/09 | (2006.01) |
| H02K 26/00 | (2006.01) |
| H02K 21/14 | (2006.01) |
| H02K 1/27 | (2006.01) |

(52) U.S. Cl.
CPC ............ *H02K 7/09* (2013.01); *H02K 1/278* (2013.01); *H02K 21/14* (2013.01); *H02K 26/00* (2013.01)

(58) Field of Classification Search
CPC  H02K 3/12; H02K 3/28; H02K 26/00; H02K 7/09
See application file for complete search history.

(56) References Cited

U.S. PATENT DOCUMENTS

| 833,635 | A | * | 10/1906 | Rogers | F16C 32/044 104/281 |
| 5,892,310 | A | * | 4/1999 | Kempas | G01C 19/30 310/152 |
| 6,166,469 | A | * | 12/2000 | Osama | F16C 32/0497 29/596 |
| 6,384,500 | B1 | * | 5/2002 | Chassoulier | F16C 32/044 310/103 |
| 6,794,780 | B2 | * | 9/2004 | Silber | F16C 32/0465 310/90.5 |
| 7,544,143 | B2 | * | 6/2009 | Schuler | B60N 2/0244 475/150 |
| 8,339,003 | B2 | * | 12/2012 | Prudham | H02K 1/146 310/216.072 |

\* cited by examiner

*Primary Examiner* — Dang Le
(74) *Attorney, Agent, or Firm* — Andrew Wilford

(57) ABSTRACT

A drive system in the form of a torque motor, comprising a stator (1), a rotor (3) and exciter coils (2) on the stator and permanent magnets (4) on the rotor (3), the magnets being located radially opposite one another across an air gap such that electrical excitation of the exciter coils (2) creates magnetic fields extending across the gap and rotating the rotor (3) relative to the stator (1), characterized in that, with the drive system arranged/oriented for normal operation and with the rotor (3) located on the inside, a lower half of the stator (1) has a smaller number of exciter coils than an upper half and, with the stator (1) located on the inside, the upper half of the stator (1) has a smaller number of exciter coils than the upper half.

6 Claims, 1 Drawing Sheet

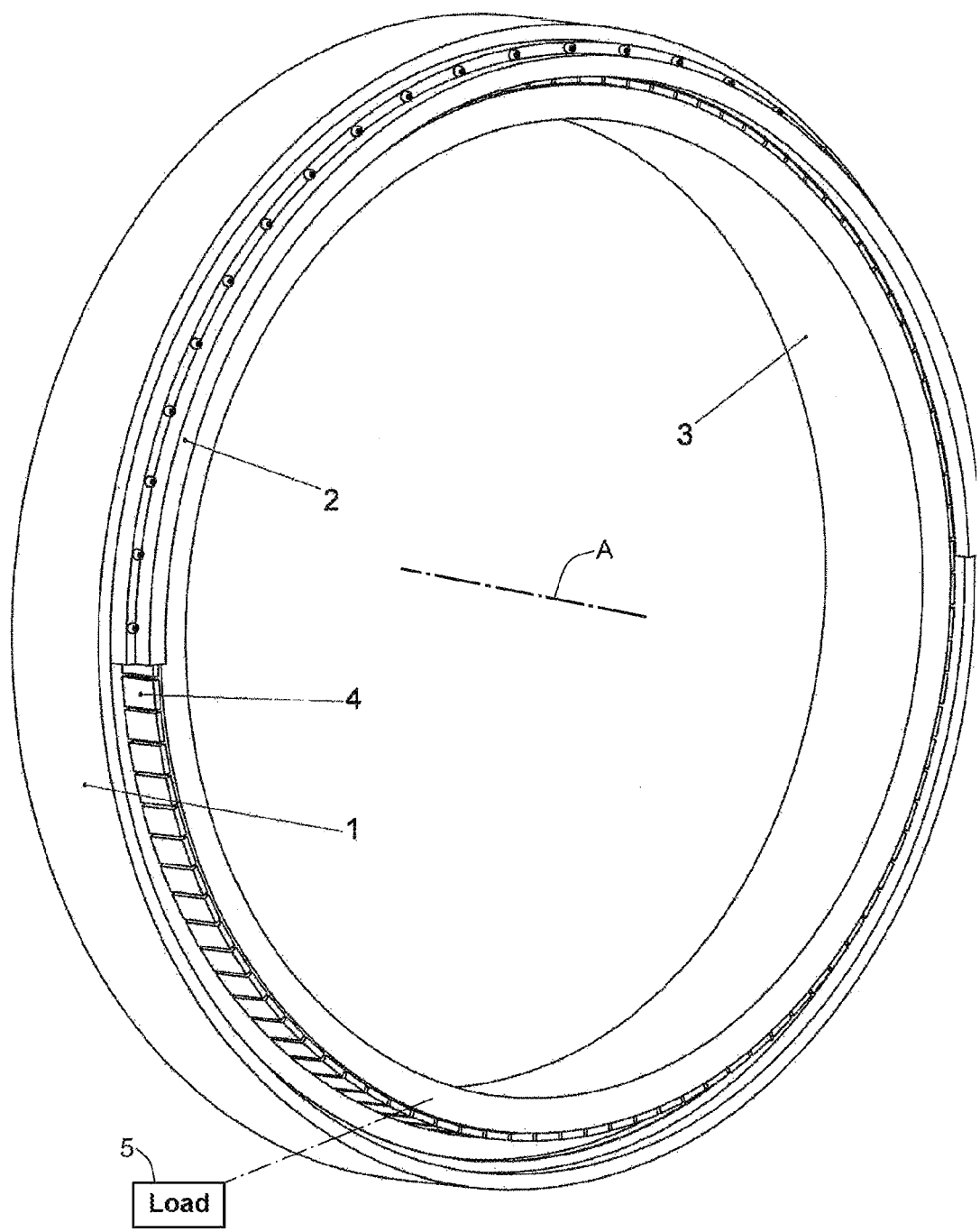

DRIVE SYSTEM IN THE FORM OF A TORQUE MOTOR

FIELD OF THE INVENTION

The invention relates to a drive system in the form of a torque motor, comprising a stator and a rotor and exciter coils on the stator and permanent magnets on the rotor, the magnets being located radially opposite one another across an air gap such that electrical excitation of the exciter coils creates magnetic fields extending across the gap and rotating the rotor relative to the stator.

BACKGROUND OF THE INVENTION

Such torque motors are known from practice in various embodiments and are used primarily as a direct drive in rotary tables or as a pivot axis of machining centers. They are also used in rotary machines, plastic injection molding machines, and wood processing machines and also in robotics, but also in special applications such as computer tomography and magnetic resonance tomography equipment.

In principle, torque motors work the same as normal synchronous motors. Usually the permanent magnets are glued on the inner surface of a drum that forms the rotor and that serves as the drive. The stator consists of a plurality of coils that are incorporated in an iron matrix. These coils are wye-connected and are supplied with 3-phase AC current. The frequency determines the rotation speed.

Due to the relatively high number of poles, high torque can be achieved at low rotation speeds. Jamming is minimized as a result of the particular arrangement of the permanent magnets. Since the magnets are coupled directly to the elements to be driven, there is no play between tooth flanks rubbing against each other.

In conjunction with prestressed roller bearings, this combination exhibits absolutely no play. Depending on the measurement system used, the stiffness of the drive can also be drastically increased, i.e. greater power and precision. Furthermore, the angular velocity and angular acceleration values can be considerably improved.

Particularly in the case of computer tomography and magnetic resonance tomography equipment, the rotor—which is then usually designed as a hollow shaft—has a large diameter and a corresponding weight, which places particular demands on the bearing.

OBJECT OF THE INVENTION

The object of the invention is to improve a drive system of the type described above so that one-sided bearing loads can be entirely or largely ruled out.

SUMMARY OF THE INVENTION

According to the invention this object is achieved in that, with the drive system arranged/oriented for normal operation and with the rotor located on the inside, a lower half of the stator below the rotor's rotation axis has a smaller number of exciter coils than an upper half and, with the stator located on the inside, the upper half of the stator has a smaller number of exciter coils than the lower half.

The advantage achieved by the invention is substantially that, due to the uneven distribution of the exciter coils around the circumference of the stator, a resulting force component of the magnetic fields remains, and the orientation of the individual exciter coils should advantageously be symmetrical manner relative to the force of gravity acting on the rotor.

It has proven to be advantageous within the context of the invention if, with the rotor located on the inside, the upper half of the stator is fully populated with exciter coils and the lower half of the stator has no exciter coils. As a result, the force component acting to relieve the load on the bearing can have maximum efficacy.

Correspondingly, it is advantageous if, with the stator located on the inside, the lower half of the stator is fully populated with exciter coils and the upper half of the stator has no exciter coils.

It is also advantageous if the design of the exciter coils, the air gap, the magnitude of the magnetic field strength and also further features influencing the magnetic force acting linearly on the rotor are balanced such that the force of gravity acting on the rotor is fully or at least largely compensated thereby. As a result, the load on the bearing can be optimally relieved, in any event with regard to the weight of the rotor that is to be supported.

BRIEF DESCRIPTION OF THE DRAWING

The invention will be explained in more detail below with reference to an embodiment shown in the drawing whose sole FIG. shows the drive system according to the invention in a perspective view.

SPECIFIC DESCRIPTION OF THE INVENTION

Of the drive system designed in the form of a torque motor, substantially only the stator 1 and the rotor 3 are shown in the drawing. In a manner that is not illustrated, the rotor 3 is mounted for rotation about a horizontal axis A relative to the stator 1, for which purpose use is made of conventional bearings, in particular roller bearings having rollers 6. In a conventional arrangement, exciter coils 2 are mounted on the stator 1 and permanent magnets 4 are mounted on the rotor 3, the magnets 4 being located radially opposite the coils 2 across an air gap. As a result, through suitable electrical excitation of the exciter coils 2, the rotor 3 can be set in rotation relative to the stator 1 via magnetic fields extending across the air gap.

With the drive system arranged/oriented for normal operation as shown in the drawing and with the rotor 3 located inside the stator 1, a lower half of the stator 1 has a smaller number of exciter coils 2 than an upper half. If, on the other hand, the drive system is provided with the stator 1 on the inside, then the upper half of the stator 1 has a smaller number of exciter coils 2 than the lower half.

In the illustrated embodiment, the upper half of the stator 1 is fully populated with exciter coils 2 while the lower half of the stator has no exciter coils 2.

By contrast, in the alternative possibility in which the stator is located on the inside, the lower half of the stator 1 is fully populated with exciter coils while the upper half of the stator 1 has no exciter coils 2.

Finally, the design of the exciter coils, the air gap, the magnitude of the magnetic field strength and also further features influencing the magnetic force acting linearly on the rotor 3 should be balanced such that the force of gravity acting on the rotor 3 is fully or at least largely compensated thereby, since load on the bearing in terms of the weight force of the rotor 3 is considerably relieved as a result.

The invention claimed is:

1. A drive system in the form of a torque motor comprising:
    a stator part,
    a rotor part rotatable relative to the stator part about a horizontal axis,
    exciter coils on the stator part, and
    permanent magnets on the rotor part radially opposite the coils across an air gap such that electrical excitation of the exciter coils rotates the rotor part relative to the stator part by magnetic fields that extend across the air gap, one of the parts being inside the other of the parts, a lower half of the stator part having a different number of exciter coils than an upper half of the stator part, the design of the exciter coils, a dimension of the air gap, a magnitude of the magnetic field strength influencing a magnetic force acting radially on the rotor part being balanced such that the force of gravity acting on the rotor part is at least largely compensated out.

2. The drive system according to claim 1, wherein, with the rotor part located on the inside, the upper half of the stator part is fully populated with exciter coils and the lower half of the stator part has no exciter coils.

3. The drive system according to claim 1, wherein, with the stator part located on the inside, the lower half of the stator part is fully populated with exciter coils and the upper half of the stator part has no exciter coils.

4. A drive system in the form of a torque motor comprising:
    a stator;
    a rotor rotatable in the stator about a horizontal axis;
    angularly spaced exciter coils on the stator; and
    angularly spaced permanent magnets on the rotor radially opposite the coils across an air gap such that electrical excitation of the exciter coils rotates the rotor relative to the stator by magnetic fields that extend across the air gap, a lower half of the stator having a smaller number of exciter coils than an upper half of the stator so as to largely compensate out the force of gravity acting on the rotor.

5. The drive system defined in claim 4, wherein all the exciter coils are in the upper half of the stator.

6. The drive system defined in claim 4, further comprising:
    roller elements between the stator and rotor and supporting the rotor in the stator.

* * * * *